United States Patent Office 3,317,272
Patented May 2, 1967

3,317,272
PROCESS FOR THE DYEING AND PRINTING OF POLYPROPYLENE FIBERS
Hermann Wunderlich, Cologne-Mulheim, and Max Schwarz, Leverkusen, Germany, assignors to Farbenfabriken Bayer Aktiengesellschaft, Leverkusen, Germany, a corporation of Germany
No Drawing. Filed Jan. 9, 1964, Ser. No. 336,647
Claims priority, application Germany, Jan. 11, 1963, F 38,746
9 Claims. (Cl. 8—42)

The present invention relates, in general, to the art of dyeing and printing and, in particular, to an improved process for dyeing and printing of fibers, yarns, and fabrics composed of hydrophobic textile materials. More particularly, the invention is directed to an improved process for the dyeing and printing of fibers, yarns and fabrics of polypropylene.

On of the most difficult problems involved in the development of any new fiber is the development, obviously, of satisfactory methods by which the new textile fiber is rendered dye-receptive. As is often the case, whenever a new fiber is introduced it becomes necessary to devise entirely new dyeing and printing methods. Sometimes new dyestuffs must be developed for the fibers before they can be marketed successfully. Heretofore, various processes for obtaining textile fibers from polypropylene characterized by good receptivity for dyes have been proposed. One such process for improving the dyeability of polypropylene materials which has been suggested involves mixing of the polypropylene resin with other resins such as polyamides, polyimines, polyesters or epoxy resins, so as to render the fibers dyeable, and the resulting mixtures are then spun according to conventional spinning techniques. Another process for rendering polypropylene fibrous materials dye-receptive involves the treatment of the polyolefin fiber with a reactive monomer in the presence of agents which catalyze the polymerization thereof onto the polypropylene fiber. The reactive monomers are thus bound onto the fibers by means of "graft polymerization." Typical reactive monomers which have been employed heretofore include vinyl monomers such as acrylonitrile, styrene, vinyl esters, nitrogen-containing monomers such as vinyl pyridines, isopropenyl pyridines, and other acid monomers. A variation of the last mentioned process involves mixing various monomers with the polypropylene prior to or during the spinning stage and subjecting the resulting mixture to the usual technological operations for preparing textile fibers. Still another process which has been practiced heretofore involves the chemical treatment of the polyolefin fiber such as by subjecting the same to sulfonation and treating the resulting sulfonated product with amines to create active dye-receptive sites.

A further process proposed heretofore for rendering polypropylene fibers dye-receptive involves the milling of various inorganic salts with the resin such as the halides of zinc, cadmium, mercury, calcium and magnesium to create active sites on the spun fiber for anchoring of the dyestuff molecule onto the fiber.

In spite of these advances, it has not yet been possible to dye or print modified and unmodified polypropylene materials of fibrous structure in a manner which provides a dyed or printed product which has satisfactory light-fastness and which also possesses good dry-cleaning and washing properties.

Surprisingly, it has now been found that fibers of modified and unmodified polypropylene materials can be dyed or printed in a simple fashion to provide products having good fastness properties by employing dyestuffs which are free of sulfonic acid groups and which contain an 8-hydroxyquinolyl group.

The dyestuffs, of the class described above, can be conveniently represented by the formula:

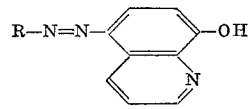

wherein R represents an aromatic nucleus free of sulfonic acid groups and selected from the group consisting of carbocyclic radicals containing a member of the group consisting of hydroxyl and carboxyl groups in the position ortho to the azo linkage, a thiazolyl radical, a benzothiazolyl radical, a triazolyl radical, a thiadiazolyl radical, a benzimidazolyl radical, a pyrazolyl radical and an indazolyl radical.

In the synthesis of the dyestuffs represented by Formula I, above, a diazo compound, derived from an aromatic amine precursor, is reacted with 8-hydroxyquinoline in a manner well known in the art. Typical and representative aromatic amine precursors which can be employed include anilinecarboxylic acids, such as anthranilic acid and 5-chloro-2-aminobenzene-1-carboxylic acid; hydroxy-substituted anilines, such as 1-amino-2-hydroxybenzene; 2-hydroxy-4- or -5-nitroaniline and 2-hydroxy-5-chloro-aniline; 1-amino-2-hydroxybenzene-4- or -5-sulphomethyl- or di-methyl- amide; 2-aminothiazole-1,3; 2-amino-benzothiazole-1,3; 2-amino-4,5,6,7-tetrahydrobenzothiazole; 2-amino-6-ethoxy - benzothiazole - 1,3; 2-amino-6-methyl-benzothiazole-1,3; 2 - amino-6-carbethoxy-benzothiazole-1,3; 2-amino-4- or -5-nitro- or -halo- or -cyano- or -methyl- or -phenyl- or -carboxy- or carbethoxy- or -hydroxythiazole-1,3; 2-amino-4-methyl-5-nitro-thiazole-1,3; 5-amino-3-phenylthiadiazole-1,2,4; 5-amino-3-ethyl-sulphonylthiazole-1,2,4; 2 - amino - 5-methyl-thiadiazole-1,3,4; 3- or 6- or 7-aminoindazole.

In particular, the process of the invention is carried out by applying the finely-dispersed dyestuffs represented by Formula I above to the polypropylene fibers or fabrics as neutral, acidic or alkaline aqueous suspensions, with the use of dispersing agents or emulsifiers, from a dyebath or padding liquor, preferably at temperatures of from 50° C. to 130° C. In the case of pad-dyeing, an intermediate drying at 70° C.–90° C., followed by a brief heating to 130° C., is expedient. When temperatures up to 100° C. are employed, it is generally advantageous to add a customary carrier substance, such as trichlorobenzene, diphenyl, diphenyl ether or esters of aromatic carboxylic acids, to the dyebath.

Dispersing agents or emulsifiers which are advantageously added to the dyestuffs, are the commercial products, such as sulphite cellulose decomposition products, condensation products from higher alcohols and ethylene oxide, soaps, polyglycol ethers of fatty acid amides, formaldehyde condensation products of aromatic sulphonic acids, or mixtures of such compounds.

The dyestuffs which are barely soluble to insoluble in water can also be applied to polypropylene fabrics by a printing process. The printing paste can be thickened with a customary thickening agent, such as methyl cellulose, caro bean flour, crystal gum or sodium alginate, and may also contain the usual additives to printing pastes, such as urea, thiourea or thioglycol, or other additives used for applying water-insoluble dyestuffs, such as methylated alcohols, sodium-m-nitrobenzosulphate or aqueous emulsions of sulphonated oils. The printing paste is expediently applied to the fabric by printing with a printing block, spraying device, stencil, sieve or roller, whereupon the printed fabric is dried, and, if desired, steamed at atmospheric pressure or, if a temperature above 100° C., e.g. between 110° C. and 130° C., is required, in a closed vessel under superatmospheric pressure.

After the dyeing or printing of the polypropylene fibrous fabrics, the colored materials can be after-treated in usual manner, such as, for example, by treating them with a hot aqueous soap solution and/or a solution of a synthetic detergent.

The monoazo dyestuffs employed in accordance with the invention draw very rapidly on the polypropylene fiber. The dyeings and prints thus obtainable are distinguished by very good fastness properties. Besides a very good fastness to dry cleaning, the excellent fastness to rubbing, washing and light is particularly noteworthy.

In general, the amount of dyestuff employed to produce satisfactory results can be varied over a wide range and, thus, is not narrowly critical. Amounts of from about 0.0005 percent by weight to about 5.0 percent by weight based on the weight of the dyebath are sufficient to achieve satisfactory results.

The modified and unmodified polypropylene materials which can be dyed or printed in accordance with the invention are well known in the art and include both the isotactic and atactic types as well as mixtures thereof. Polypropylenes of the types disclosed, for example, in U.S. Patents Nos. 3,022,174, 3,022,191, 3,022,267, 3,035,035, 3,037,862 and 3,042,640, are suitable for use in the process of the invention. Particularly preferred modified polypropylenes useful in the process of the invention are the metal-modified pollypropylenes which have been spun with metal compounds of nickel, zinc, magnesium, copper or cobalt, such as nickel phenolates of bis-(alkylphenol)-monosulfides, zinc stearate, zinc oxide, zinc dibutyl dithiocarbamate and the like.

It is believed that the invention may be best understood by reference to the following specific examples illustrating the application of the foregoing principles and procedures to the dyeing of typical polypropylene materials:

*Example I*

Two-tenths (0.2) of a gram of the dyestuff of the formula:

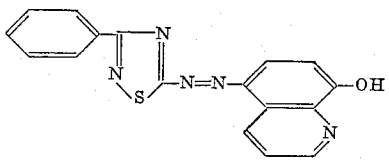

prepared by diazotization of 3-phenyl-5-amino-thiadiazole-1,2,4, and coupled with 8-hydroxyquinoline, was dispersed in 400 milliliters of water containing 0.2 milliliter of 30% acetic acid and 0.2 gram of a naphthalene-sulphonic acid/formaldehyde condensation product as a dispersing agent and dyed onto 10 grams of polypropylene fiber yarn at boiling temperature for one hour. After a weakly-alkaline after-treatment at a temperature of 40° C.–60° C. with 0.5 gram/liter of a commercial detergent and subsequent drying, a bluish-bordo dyeing with very good fastness to light, wetting, rubbing and solvents was obtained.

Dyeings with very good fastness properties on metal-modified polypropylene were also obtained by employing the diazonium compounds corresponding to the amines set forth in the following Table I instead of the diazonium compound from 3-phenyl-5-amino-thiadiazole-1.

TABLE I

| Diazo Compound | Shade of dyeing on polypropylene fibers modified by metals or metal compounds |
| --- | --- |
| 3-methyl-5-amino-thiadiazole-1,2,4 | Bluish-bordo. |
| 2-amino-5-methyl-thiadiazole-1,3,4 | Do. |
| 2-amino-thiadizaole-1,3,4 | Ruby. |
| 2-amino-4-phenyl-thiazole-1,3 | Bordo. |
| 2-amino-4,5-dimethyl-thiazole-1,3 | Do. |
| 2-amino-5-bromothiazole | Red-violet. |
| 5-nitro-2-amino-thiazole-1,3 | Blue. |
| 2-amino-thiazole-1,3 | Bordo. |
| 2-amino-benzothiazole-1,3 | Bluish-bordo. |
| 2-amino-4,5,6,7-tetrahydro-benzothiazole-1,3 | Bordo. |
| 6-methoxy-2-amino-benzothiazole-1,3 | Bluish-bordo. |
| 6-tert.butyl-2-amino-benzothiazole-1,3 | Red-violet. |
| 2-amino-triazole-1,3,4 | Yellowish-orange. |
| 6-amino-indzaole | Orange. |
| 7-amino-indazole | Do. |

*Example 2*

Ten (10) grams of endless polypropylene yarn are dyed at 90° C. for 30 minutes in a bath of 400 milliliters of water containing 0.2 gram of the finely dispersed dyestuff of the formula:

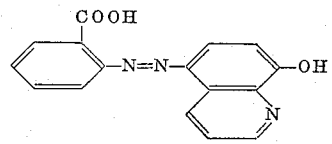

1 gram of trichlorobenzene, and 0.2 gram of a naphthalene-sulphonic acid/formaldehyde condensation product. By the after-treatment described in Example I a violet shade of very good fastness properties was obtained.

*Example 3*

One (1) gram of the finely-dispersed dyestuff of the formula:

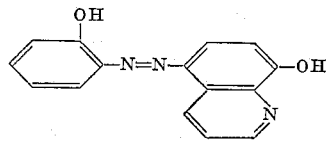

was stirred into 2 liters of water which was adjusted with dilute sulphuric acid to pH 4–5, and contained 4 grams of methyl salicylate and 4 grams of a weakly anion-active alkylphenyl polyglycol ether sulphate. One hundred (100) grams of polypropylene fiber material in the form of combed material were dyed in this bath at 100° C. for one hour. After soaping and drying, an orange dyeing with very good fastness to perchloroethylene, to rubbing, wetting and to light was obtained.

Very valuable dyeings on polypropylene materials were also obtained by employing the diazonium compounds corresponding to the amines set forth in the following Table II instead of the diazonium compound of this example:

TABLE II

| Diazo Compound | Shade of dyeing on metal-modified polypropylene materials |
| --- | --- |
| 1-amino-2-hydroxybenzene-4-sulphodimethylamid | Red. |
| 1-amino-2-hydroxybenzene-5-sulphodimethylamid | Reddish-orange. |
| 1-amino-2-hydroxybenzene-5-ethylsulphone | Red. |
| 2-hydroxy-4-nitroaniline | Bordo. |
| 2-hydroxy-5-nitroaniline | Reddish-orange. |
| 2-hydroxy-5-chloroaniline | Yellowish-red. |
| 2-hydroxyaniline-6-sulphomethylene-ether-5 of the formula: | Bordo. |

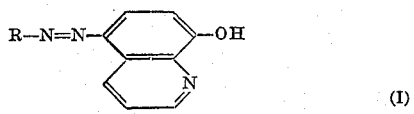

The dyeing results given in Examples 1-3 were obtained by employing polypropylene fibrous materials which were spun with various metals such as the nickel phenolates of bis(alkylphenol) monosulphides, nickel and zinc dithiocarbamates, nickel and zinc salts of organic fatty acids such as zinc stearate and the like.

Having thus described the subject matter of the invention, what is desired to secure by Letters Patent is:

What is claimed is:

1. Process for the dyeing and printing of polypropylene fibers that comprises, dyeing the fibers with an aqueous dispersion of a dyestuff represented by the formula:

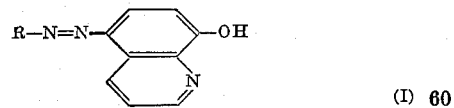

wherein R represents an aromatic nucleus free of sulfonic acid groups, selected from the group consisting of carbocyclic radicals containing a member of the group consisting of hydroxyl and carboxyl groups in the position ortho to the azo linkage, a thiazolyl radical, a benzothiazolyl radical, a triazolyl radical, a thiadiazolyl radical, a benzimidazolyl radical, a pyrazolyl radical and an indazolyl radical.

2. Process for the dyeing and printing of metal-modified polypropylene fibers that comprises, dyeing the fibers with an aqueous dispersion of the dyestuff represented by the formula:

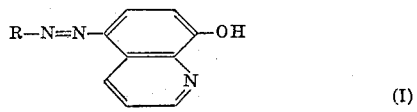

wherein R represents an aromatic nucleus free of sulphonic acid groups, selected from the group consisting of carbocyclic radicals containing a member of the group consisting of hydroxyl and carboxyl groups in the position ortho to the azo linkage, a thiazolyl radical, a benzothiazolyl radical, a triazolyl radical, a thiadiazolyl radical, a benzimidazolyl radical, a pyrazolyl radical, and an indazolyl radical.

3. The process as claimed in claim 2, wherein the polypropylene fiber is modified by a metal selected from the group consisting of nickel, zinc, magnesium, copper and cobalt.

4. Process for the dyeing and printing of nickel-modified polypropylene fibers that comprises dyeing the fibers with an aqueous dispersion of a dyestuff represented by the formula:

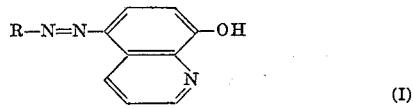

wherein R represents an aromatic nucleus free of sulphonic acid groups, selected from the group consisting of carbocyclic radicals containing a member of the group consisting of hydroxyl and carboxyl groups in the position ortho to the azo linkage, a thiazolyl radical, a benzothiazolyl radical, a triazolyl radical, a thiadiazolyl radical, a benzimidazolyl radical, a pyrazolyl radical and an indazolyl radical.

5. Process for the dyeing and printing of zinc-modified polypropylene fibers that comprises dyeing the fibers with aqueous dispersion of a dyestuff represented by the formula:

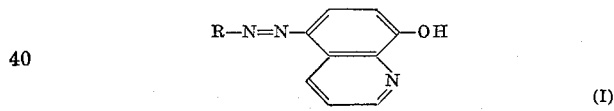

wherein R represents an aromatic nucleus free of sulphonic acid groups, selected from the group consisting of carbocyclic radicals containing a member of the group consisting of hydroxyl and carboxyl groups in the position ortho to the azo linkage, a thiazolyl radical, a benzothiazolyl radical, a triazolyl radical, a thiadiazolyl radical, a benzimidazolyl radical, a pyrazolyl radical and an indazolyl radical.

6. Process for the dyeing and printing of metal-modified polypropylene fibers that comprises, dyeing the fibers at a temperature in the range of from 50° C. to 130° C. in an aqueous dyebath containing a dyestuff of the formula:

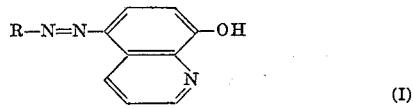

wherein R represents an aromatic nucleus free of sulfonic acid groups, selected from the group consisting of carbocyclic radicals containing a member of the group consisting of hydroxyl and carboxyl groups in the position ortho to the azo linkage, a thiazolyl radical, a benzothiazolyl radical, a triazolyl radical, a thiadiazolyl radical, a benzimidazolyl radical, a pyrazolyl radical and an indazolyl radical.

7. Process for the dyeing and printing of metal-modified polypropylene fibers that comprises, dyeing the fibers at a temperature in the range of from 50° C. to 130° C. in an aqueous dyebath containing a dyestuff of the formula:

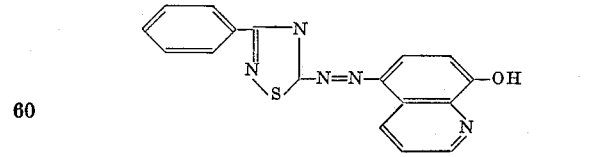

8. Process for the dyeing and printing of metal-modified polypropylene fibers that comprises, dyeing the fibers at a temperature in the range of from 50° C. to 130° C. in an aqueous dyebath containing a dyestuff of the formula:

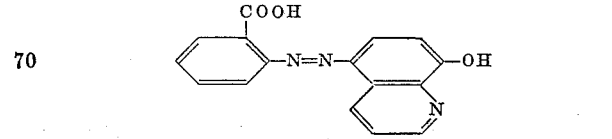

9. Process for the dyeing and printing of metal-modified polypropylene fibers that comprises, dyeing the fibers at a temperature in the range of from 50° C. to 130° C. in an aqueous dyebath containing a dyestuff of the formula:
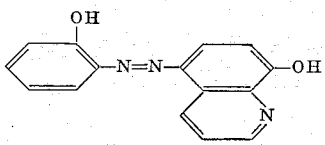
References Cited by the Examiner
UNITED STATES PATENTS
3,071,428  1/1963  Gross et al. _____ 8—42
3,186,788  1/1965  Mills et al. _____ 8—55
3,203,752  8/1965  Mills et al. _____ 8—55
NORMAN G. TORCHIN, *Primary Examiner.*
J. HERBERT, *Assistant Examiner.*